United States Patent [19]

Sewerinson

[11] Patent Number: 4,530,094
[45] Date of Patent: Jul. 16, 1985

[54] CODING FOR ODD ERROR MULTIPLICATION IN DIGITAL SYSTEMS WITH DIFFERENTIAL CODING

[75] Inventor: Ake N. Sewerinson, Port Coquitlain, Canada

[73] Assignee: AEL Microtel, Limited, Burnaby, Canada

[21] Appl. No.: 425,357

[22] Filed: Sep. 28, 1982

[51] Int. Cl.³ .............................................. G06F 11/10
[52] U.S. Cl. ........................................ 371/43; 375/56
[58] Field of Search ...................... 371/43, 55; 375/56

[56] References Cited

U.S. PATENT DOCUMENTS

| | | | |
|---|---|---|---|
| 3,436,730 | 4/1969 | Widel | 371/55 |
| 3,891,959 | 6/1975 | Tsuji et al. | 371/43 |
| 4,035,767 | 7/1977 | Chen et al. | 371/43 |
| 4,092,491 | 5/1978 | Frazer | 375/56 |
| 4,128,828 | 12/1978 | Samejima et al. | 371/43 |
| 4,211,996 | 7/1980 | Nakamura | 371/43 X |
| 4,346,472 | 8/1982 | Ohkoshi et al. | 371/43 X |

Primary Examiner—Charles E. Atkinson
Attorney, Agent, or Firm—Leonard R. Cool

[57] ABSTRACT

Differential encoding is commonly used in data transmission systems because it allows correct recovery of the data even though the polarity may have changed during transmission. However, single errors which are introduced result in double errors, i.e., error of an even number following the differential decoding process. Because many error detection schemes rely upon parity checks, which look for an odd number to determine if an error has occurred, the conversion of the single error to a double error means that single errors normally would not be detected. A precoder is used to introduce correlation by modulo two addition of the precoded present digit with a selected combination of past digits. The differential decoder will still provide double errors but a subsequent decoder, which reverses the precoding process, at least partially changes double errors into errors of an odd number.

21 Claims, 10 Drawing Figures

CODING FOR ODD ERROR MULTIPLICATION IN DIGITAL SYSTEMS WITH DIFFERENTIAL CODING

BACKGROUND DESCRIPTION

This invention relates to data transmission systems, and in particular to a technique for precoding, prior to differential coding of the transmitted data, and subsequent decoding following differential decoding in order to at least partially change double errors, which occur as a result of the differential encoding and decoding of a single error, to a quantity of errors having an odd number.

Differential coding is used in digital carrier systems because it permits the simplification of the regeneration at a receiver. This is because the phase ambiguities, that may arise due to erroneous polarity changes that may occur in transmission, are resolved in the differential decoding process. Differential coding will guarantee that the received decoded data is identical to the original data at the transmitter input, whether or not the received data has been inverted during the demodulation process. Differential coding can be visualized by realizing that at the transmitter a 1-polarity signal element is tranmmitted as a signal element which changes polarity while a 0-polarity is the signal element that does not cause any change of polarity. At the receiver a 1-polarity is generated if two successive signal elements have different polarities, while the reception of two signal elements with the same polarity causes a 0-polarity signal element to be generated. It may be readily seen that such a system will change each single error that occurs during transmission to a double error in the differential decoding process. This is important to error detection using parity checks, because one of the more commonly used error detection techniques employs the addition of an extra bit to the binary word according to the rule that the total number of 1's, after the addition, must be either odd or even. Because single errors introduced in differentially encoded digital data are converted to double errors, they will pass through the system undetected.

One technique by which the double errors introduced by differential coding are reduced to single errors is described in U.S. Pat. No. 3,436,730, entitled "Method of Detecting and Correcting An Error in Polarity Change in a Data Transmission System", granted Apr. 1, 1969 to W. H. E. Widel. The detecting and correcting means in the invention there includes integrating means for separately integrating the positive and negative lobes of each received data element to produce two signals which are combined to produce a difference signal. The magnitude of the difference signal is compared with a predetermined threshold value. If the magnitude is less than the threshold value a signal is generated which activates means for reversing the sense of the related data signal element which thus reduces the double error to a single error. While the apparatus used to perform the change of the double error to the single error is located at the receiver, it should be noted that the device is complex in that considerable logic is required and there is a delay in the operation of the device.

SUMMARY OF THE INVENTION

In a binary data transmission system which employs differential encoding so as to permit correct binary data reconstruction at a receiver, despite an erroneous polarity change that may occur in transmission, apparatus for at least partially changing double errors, which occur as a result of the differential encoding of a single error, to an odd number of errors, said apparatus including a precoder at a transmitter which preceeds the differential encoder, whereby correlation is introduced; and a subsequent decoder at a receiver which accepts the differential decoded binary signal, reverses the correlation process introduced at the transmitter and provides the original binary signal at an output so long as no errors are introduced in transmission; and changes a significant number of double errors into an odd number of errors, if errors are introduced in transmission.

DETAILED DESCRIPTION OF THE INVENTION

In order to more readily understand the improvement effected by the instant invention, it is first necessary to understand how an error introduced in transmission, following differential encoding, is acted upon at the receiving end by a differential decoder.

Figure 1:
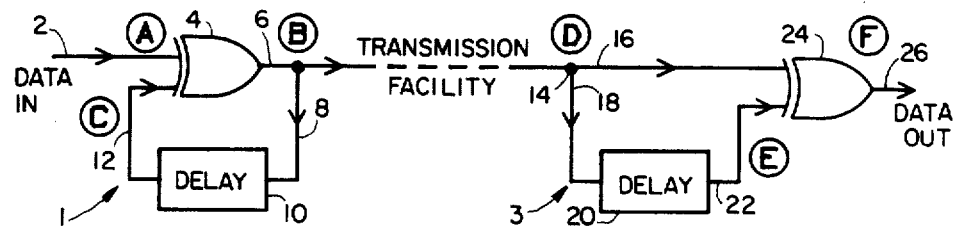
FIG. 1 shows a coder and a decoder by which differential encoding may be obtained.
Figure 2A:
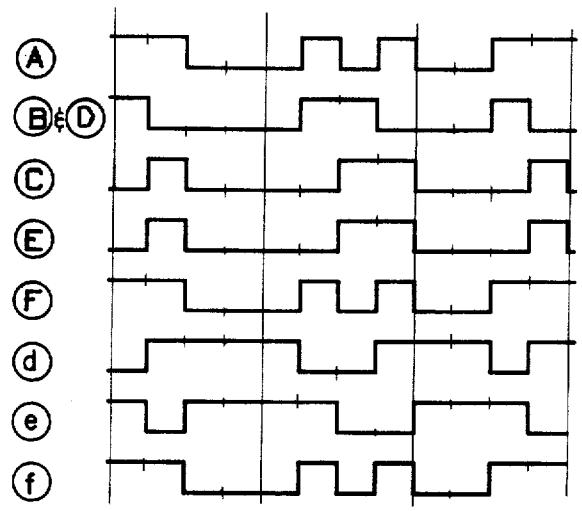
FIG. 2A shows the waveform diagrams for the original data (A) and the encoded signal waveform (B), as well as the waveforms for the decoding process for the differential encoder of FIG. 1.

Referring now to FIG. 1 a differential encoder and a differential decoder are illustrated. While not shown it should be understood that the transmission facility between the encoding and decoding equipments may include some form of modulation such as is commonly used in the transmission of digital information between a transmitter and a receiver, and it is this modulation process which often results in the inversion, i.e., erroneous polarity changes which may occur in transmission. To overcome the effect of this inversion, differential encoding was devised. One technique by which this may be accomplished is illustrated in FIG. 1 and the waveforms related to the various parts of the coding and decoding circuits are shown in FIG. 2A. Referring now to FIG. 1 it may be seen that the input data is applied via path 2 to an Exclusive OR-gate 4. A representation of the data input is shown at waveform A, FIG. 2A. The second input to Exclusive OR-gate 4 is the delayed output of the Exclusive OR-gate which passes via path 6, path 8 delay 10 and path 12 to the second input of the Exclusive OR-gate 4. In analyzing the differential encoding circuit it was assumed that the input on path C was initially a "0" and thus the output on path 6 and shown at B in FIG. 2 is a binary "1". This binary 1 is then delayed by 1 symbol interval and it appears at the second time slot in the waveform C. Since the input data is also a binary "1" during this time slot the output at path 6 is a binary 0. Following this procedure the waveform output at path 6 shown at waveform B in FIG. 2A is constructed, and this also appears, so long as no errors are introduced, as the waveform input to the differential decoder at the receiving end. In analyzing the effect of the decoder, it is again assumed that the initial output of delay 20 on path 22 is a binary "0" as shown at waveform E, FIG. 2A in time slot 1. Again because the incoming waveform is a binary "1" in time slot 1 and is applied to one input of Exclusive OR-gate 24 along with the binary "0" from path 22, waveform E, the output on path 26 and shown in waveform F is a binary 1. Following this decoding procedure it is seen that the original data is obtained on path 26. Waveforms d, e, and f show the effect of an inversion of the waveform D and illustrate that regardless of the inversion the original data can be obtained by using the differential decoding technique illustrated.

Figure 2B:
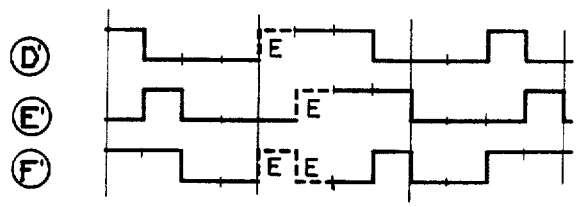
FIG. 2B is a waveform diagram and shows the effect of the differential decoding process on a single error introduced during transmission.

A problem arises when an error is introduced in the transmission facility. Such an event is illustrated in FIG. 2B where the error shown as E, waveform D' changes the received data by adding a binary "1". Following the decoding processes illustrated for the case where there is no error introduced it is discovered that a single error results in a double error following the decoding process, and this is illustrated in waveform F', FIG. 2B. As noted hereinabove, this transition of a single error into a double error most often precludes the detection of the presence of the error by commonly used parity checks. It is therefore desirable to convert such double errors to a single error or to provide some other means by which the single error introduced in transmission will most often result in an error presence having a odd number.

Figure 3:
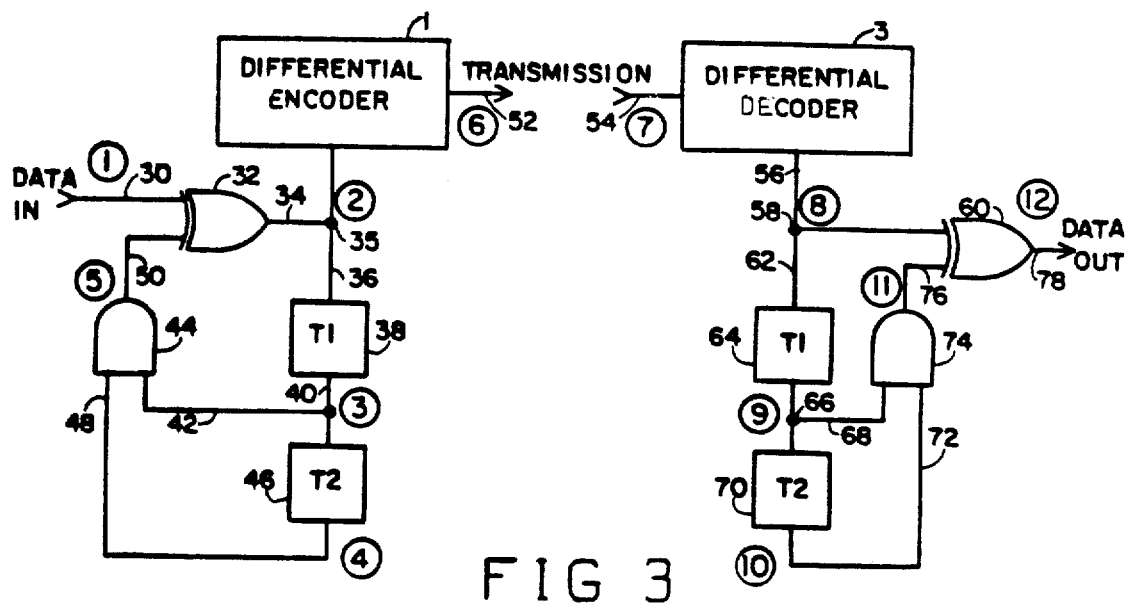
FIG. 3 shows one precoding and one subsequent decoding technique associated therewith which may be employed in the instant invention.
Figure 5A:
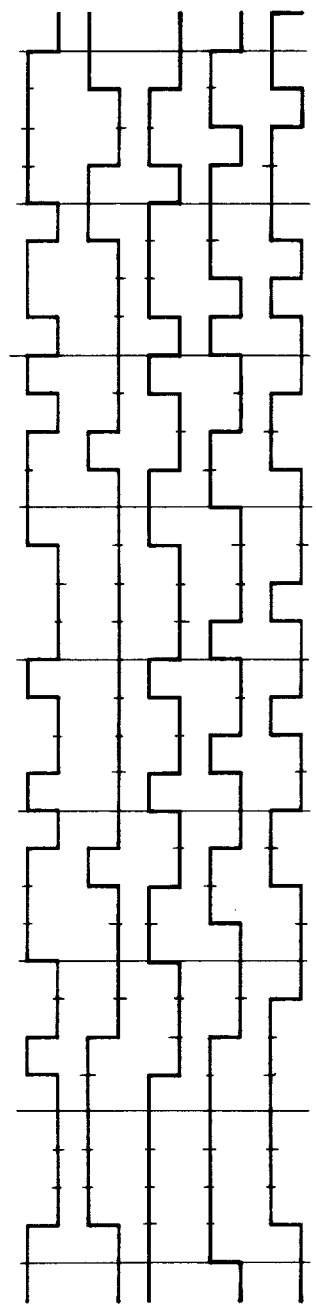
FIG. 5A is a waveform diagram which shows how a data signal shown at (1), in the figure, would appear at the various corresponding numbered points as designated in the precoder illustrated in FIG. 3.
Figure 5B:
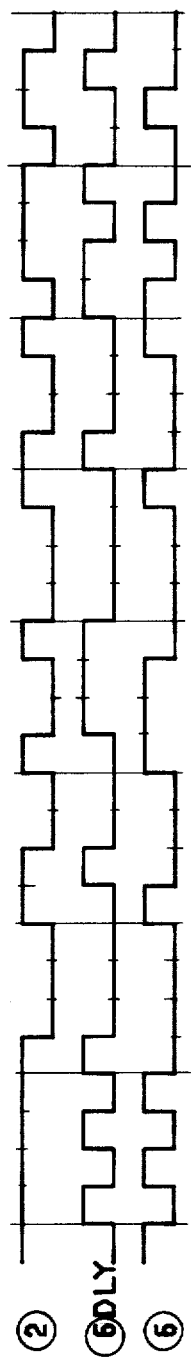
FIG. 5B shows the effect of the differential encoder on the waveform (2) in deriving the transmitted digital signal (6)

One manner in which this may be done is illustrated in FIG. 3 in which a precoder is introduced prior to differential encoding and following the differential decoding a subsequent decoder is employed. Referring now to the encoder of FIG. 3 the data input is applied along the path 30 to one input of Exclusive OR-gate 32. The output of Exclusive OR-gate 32 is applied via path 34, junction 35 and path 36 to the input of a first delay 38 which may have one or more symbol interval units of delay. The output of the delay 38 is applied along a path 40 to a second delay 46, which also might have one or more units of delay, and also along path 42 to one input of AND-gate 44. The output of the second delay 46 is applied via path 48 to a second input of AND-gate 44, and the output of AND-gate 44 is applied along path 50 to a second input of Exclusive OR-gate 32. In the example waveforms shown in FIG. 5A each of the delays 38 and 46 have been taken to have one unit delay, i.e., one time slot at the data rate. The waveforms are numbered corresponding with the numbers in the circles of the diagram, and thus the precoded data is shown at waveform 2, and it is this data which is applied to the input of differential encoder 1. The effect of the differential encoder 1 on the waveform (2) is illustrated in FIG. 5B and waveform (6) is obtained. It is this waveform which may be applied to a modulation device in preparation for transmission to the receiving terminal.

Figure 5C:
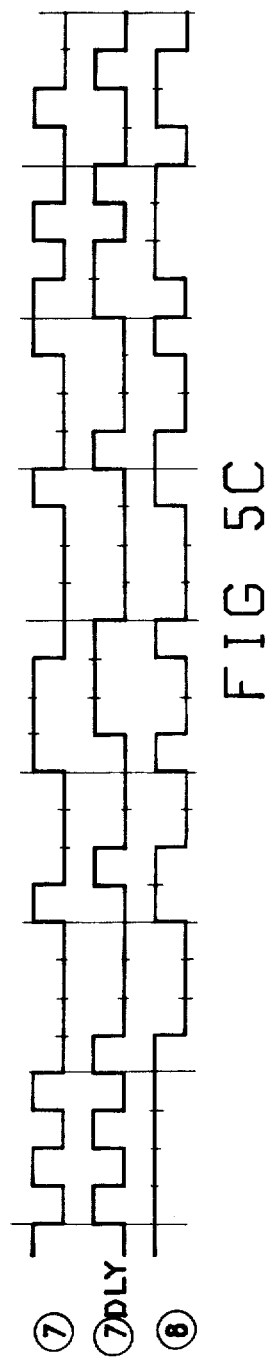
FIG. 5C illustrates the differential decoding that occurs at the receiving end of the system shown in FIG. 3.
Figure 5D:
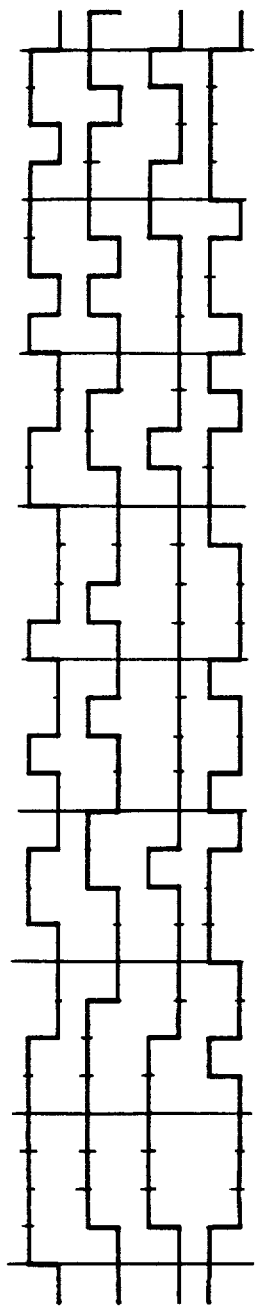
FIG. 5D illustrates the effect of the subsequent decoder in recovering the original data waveform (1) at the receiver.

The waveform which may be derived from the demodulation process appears on path 54 and is illustrated as waveform (7) in FIG. 5C. It should be noted that absent any errors occuring in transmission that waveforms (6) and (7) are identical. These would naturally be shifted in time because of delay in transmission but this delay has been eliminated in the illustration. FIG. 5C shows the effect of differential decoding, decoder 3 illustrated in FIG. 1, and it is to be noted that waveform (8) corresponds with waveform 2 at the tranmmitter. The subsequent decoder reverses the encoding process introduced by the precoder at the transmitter. The differentially decoded data is applied via path 56 junction 58 to one input of Exclusive OR-gate 60, and also via junction 58 and paths 62 to the input of a first delay 64, which provides one or more units of delay which are equal to the first said delays of the encoded data. The output of delay 64 is applied via path 66 to an input of the second delay 70 and also via path 68 to one input of AND-gate 74. The output of the second delay 70, which may also introduce one or more units of delay each of which are equal to said second delay of the encoded data, is applied via path 72 to a second input of AND-gate 74. The output of AND-gate 74 is applied via path 76 to a second input of Exclusive OR-gate 60, and the decoded data appears on path 78. Assuming that no errors occur in transmission the decoding of the differentially decoded waveform by the subsequent decoder is illustrated by the use of waveforms in FIG. 5D. Here it may be seen that the decoded waveform shown at 12, FIG. 5D is the same as the original data shown at 1 in FIG. 5A.

Figure 5E:
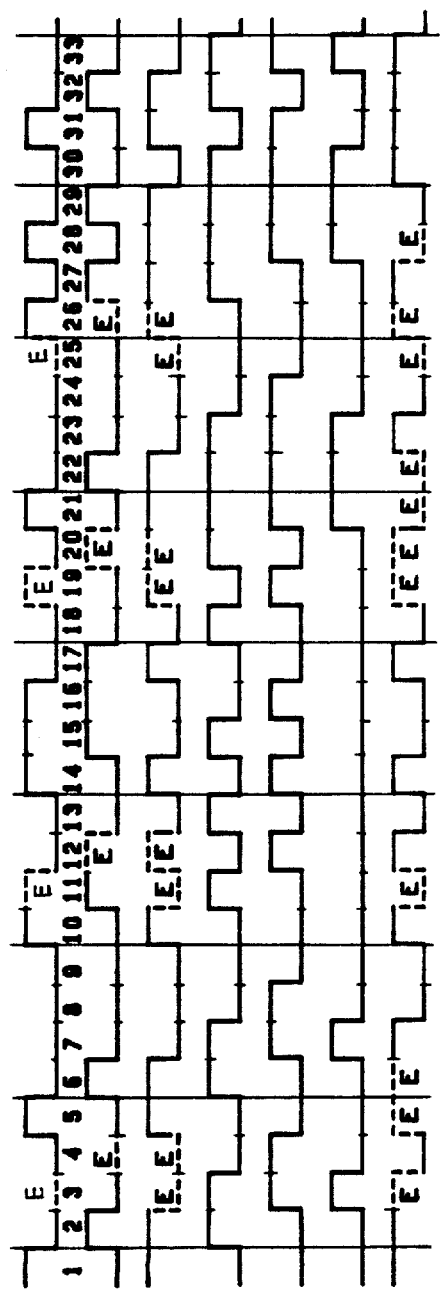
FIG. 5E illustrates the effect of introducing single errors during transmission and the decoding effect thereon.

Now it is important to learn what the effect of the precoding and subsequent decoding processes have on the introduction of single errors which may occur during transmission. Referring now to FIG. 5E the waveform 7 is shown and it is noted that single errors occur at time slots 3, 11, 19 and 25 in the received waveform. By action of differential decoding it may be seen that these single errors have been converted to double errors in waveform 8 but by a process of subsequent decoding the single errors introduced during transmission at time slots 3, 11 and 25 have been converted into errors having an odd number, and only the error introduced at time slot 19 has been converted into a plurality of errors having an even number.

Figure 4:
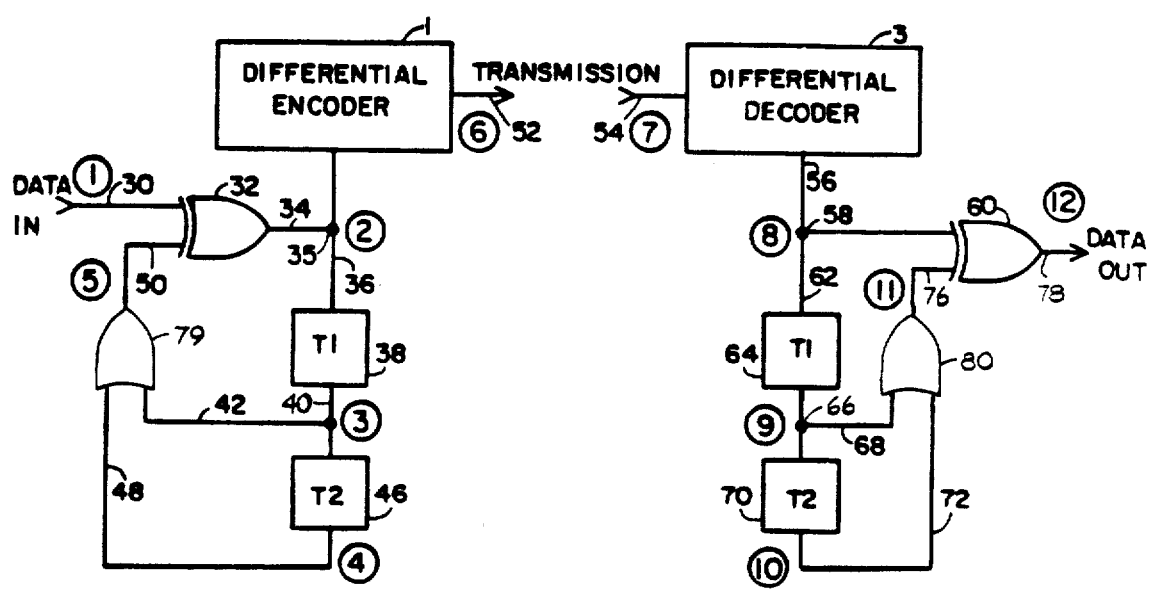
FIG. 4 shows another embodiment in which a second precoding and subsequent decoding technique are employed using the techniques of the invention.

FIG. 4 illustrates a modification of the invention as shown in FIG. 3 which may be employed to obtain essentially the same result. In this case the AND-gate 44 of the precoder has been replaced by an OR-gate 79; and the AND-gate 74 of the subsequent decoder has been replaced by an OR-gate 80. An analysis similar to that given for FIG. 3 and illustrated in waveforms shown in FIG. 5 may be readily demonstrated and for this reason the waveform analysis and related discussion has not been included. However, it should be understood that this change provides substantially the same result as that described hereinabove for the embodiment shown in FIG. 3.

What is claimed is:

1. In a binary data transmission system which employs differential encoding by way of a differential encoder in a transmitter, so as to permit correct binary data reconstruction at a receiver having a differential decoder despite an erroneous polarity change that may occur in transmission, apparatus for at least partially changing double errors, which occur in the receiver as a result of differential decoding of a single error, to an odd number of errors there, comprising:

a precoder means at the transmitter which preceeds the differential encoder, said precoder having an input for accepting binary input data and acting on the binary input data to provide a precoded binary signal at an output, which is adapted for connection to an input of the differential encoder, the present digit of said precoded binary signal being correlated with first and second past precoded digits taken in combination; and a subsequent decoder means subsequent to the differential decoder at the receiver that has an input adapted to accept a differentially decoded binary signal from the output of the differential decoder, said subsequent decoder means reversing the correlation process at the receiver to provide at an output of said subsequent decoder means a decoded binary data signal which is the original binary input data signal entered at the transmitter, so long as no errors are introduced, and including errors having an odd number thereof in most cases, if errors are introduced in transmission.

2. Apparatus as set forth in claim 1 wherein said precoder means comprises:

a first gating means having a first input adapted to receive said binary input data, having a second input and providing said precoded signal at an output;

a first delay means having an input connected to the output of said first gating means and providing a first-past precoded signal having a first time delay at a first output and a second-past precoded signal having a second time delay at a second output; and second gating means having first and second inputs adapted to receive said first and second-past precoded signals, and having an output connected to the second input of said first gating means.

3. Apparatus as set forth in claim 2 wherein said subsequent decoder means comprises:

a third gating means having a first input adapted to accept the differentially decoded binary signal, having a second input and providing the decoded binary data signal at an output;

second delay means having time delays equal to those of said first delay means, having an input adapted to accept said differentially decoded binary signal, providing at a first output a first delayed representation of said differentially decoded signal having said first time delay, and providing at a second output a second delayed representation of said differentially decoded signal having said second time delay; and fourth gating means having first and second inputs adapted to receive the first and second delayed outputs from said second delay means and to provide at an output a binary signal in response thereto, said output being connected to said second input of said third gating means.

4. Apparatus as set forth in claim 3 wherein said first and second delay means each comprise a two stage shift register having an input adapted to receive the output from said first gating means and the differential decoder, respectively, and each providing parallel outputs, one from each stage so that the first delay is equal to one binary digit interval and the second delay is equal to two binary digit intervals.

5. Apparatus as set forth in claim 4 wherein said first and third gating means are each an Exclusive OR-gate.

6. Apparatus as set forth in claim 5 wherein said second and fourth gates are each an AND-gate.

7. Apparatus as set forth in claim 5 wherein said second and fourth gates are each an OR-gate.

8. Apparatus according to claim 1 wherein said precoder means comprises first AND-gate means for logically combining said first and second past precoded digits, and first means for correlating said binary input data and the output of said first AND-gate means.

9. Apparatus according to claim 1 wherein said precoder means comprises first OR-gate means for logically combining said first and second past precoded digits, and first means for correlating said binary input data and the output of said first OR-gate means.

10. Apparatus according to claim 8 wherein said subsequent decoder means comprises second AND-gate means for logically combining first and second past differentially decoded digits from the differential decoder, and second means for correlating the differentially decoded binary signal with the output of said second AND-gate means.

11. Apparatus according to claim 9 wherein said subsequent decoder means comprises second OR-gate means for logically combining first and second past differentially decoded digits from the differential decoder, and second means for correlating the differentially decoded binary signal with the output of said second OR-gate means.

12. Apparatus according to claim 10 wherein each of said first and second correlating means comprises an exclusive-OR-gate means.

13. Apparatus according to claim 11 wherein each of said first and second correlating means comprises an exclusive-OR-gate means.

14. Apparatus according to claim 1 wherein the first and second past precoded digits are adjacent digits.

15. Apparatus according to claim 1 wherein the first and second past precoded digits are adjacent digits immediately preceeding said present precoded digits.

16. Apparatus according to claim 15 wherein said precoder means comprises first AND-gate means for logically combining said first and second past precoded digits, and first means for correlating said binary input data and the output of said first AND-gate means.

17. Apparatus according to claim 15 wherein said precoder means comprises first OR-gate means for logically combining said first and second past precoded digits, and first means for correlating said binary input data and and the output of said first OR-gate means.

18. Apparatus according to claim 16 wherein said subsequent decoder means comprises second AND-gate means for logically combining first and second past differentially decoded digits from the differential decoder, and second means for correlating the differentially decoded binary signal with the output of said second AND-gate means.

19. Apparatus according to claim 17 wherein said subsequent decoder means comprises second OR-gate means for logically combining first and second past differentially decoded digits from the differential decoder, and second means for correlating the differentially decoded binary signal with the output of said second OR-gate means.

20. Apparatus according to claim 18 wherein each of said first and second correlating means comprises an exclusive-OR-gate means.

21. Apparatus according to claim 19 wherein each of said first and second correlating means comprises an exclusive-OR-gate means.

* * * * *